United States Patent [19]

Lee

[11] Patent Number: 5,555,026

[45] Date of Patent: Sep. 10, 1996

[54] METHOD AND APPARATUS FOR STABILIZING A VIDEO STATE OF A VIDEO DISPLAY HAVING A PICTURE-IN-PICTURE FUNCTION

[75] Inventor: Kab-keun Lee, Suwon, Rep. of Korea

[73] Assignee: Samsung Electronics Co., Ltd., Kyungki-do, Rep. of Korea

[21] Appl. No.: 351,534

[22] Filed: Dec. 7, 1994

[30] Foreign Application Priority Data

Dec. 7, 1993 [KR] Rep. of Korea .................. 93-26719

[51] Int. Cl.[6] ........................ H04N 5/45; H04N 5/59
[52] U.S. Cl. .................. 348/565; 348/380; 348/687; 348/678
[58] Field of Search .................... 348/565, 564, 348/588, 687, 805, 678, 679, 377, 380; H04N 5/45, 5/59

[56] References Cited

U.S. PATENT DOCUMENTS 3,558,817 1/1971 Van den Avoort .................. 348/380
5,204,748 4/1993 Lagoni ............................ 358/169
5,229,855 7/1993 Siann ............................ 348/588

*Primary Examiner*—Safet Metjahic
*Assistant Examiner*—Sherrie Hsia
*Attorney, Agent, or Firm*—Sughrue, Mion, Zinn, Macpeak & Seas

[57] ABSTRACT

A video state stabilization apparatus for use in a video display unit for displaying a sub-picture within a main picture. The video state stabilization apparatus receives a main picture ABL control signal, and has a sub-picture beam current detector for generating a sub-picture ABL control signal by receiving a sub-video signal, and using an integrator and a differential amplifier, a switching portion for outputting the sub-picture ABL control signal and the main picture ABL control signal in response to a respective interval of the sub-picture and the main picture, and an adjuster for separately adjusting a brightness of a video signal of the main picture and of the subpicture, so as to make a PIP image with respect to the main picture and the sub-picture according to the ABL control signals output from the switching portions.

13 Claims, 3 Drawing Sheets

METHOD AND APPARATUS FOR STABILIZING A VIDEO STATE OF A VIDEO DISPLAY HAVING A PICTURE-IN-PICTURE FUNCTION

BACKGROUND OF THE INVENTION

The present invention relates to a video display having a picture-in-picture (PIP) function for simultaneously displaying two pictures, a main picture and a sub-picture, and more particularly to a video state stabilization method and apparatus for use in a video display having a picture-in-picture function in which the brightness of a sub-picture is not influenced by that of a main picture.

FIG. 1 shows a conventional apparatus for adjusting the video brightness when two pictures, that is, two channels, are simultaneously viewed on a single display, or when video signals supplied from a television and a video cassette recorder are simultaneously viewed on a single display.

FIG. 1 is a block diagram of a video display having a conventional PIP function. A video signal processor 11 receives a main video signal $V_M$ corresponding to a main picture and a sub-video signal $V_s$ corresponding to a sub-picture, respectively. Video signal processor 11 compresses sub-video signal $V_s$ into a signal appropriate to a sub-picture, and then replaces a portion of main video signal $V_M$ with sub-video signal $V_s$, to simultaneously display the main picture and the sub-picture. Then, video signal processor 11 separates the combined video signal into a luminance signal Y, red color difference signal R-Y and blue color difference signal B-Y, and supplies the separated signals to video signal adjuster 15. Video signal adjuster 15 converts luminance signal Y and color difference signals R-Y and B-Y into primary color signals, R, G and B. Video signal adjuster 15 also adjusts the contrast, brightness, color density and color tone with respect to the input video signals in response to a control signal supplied from a controller 12 and an automatic beam limiting (ABL) control signal supplied from a beam current detector 14. An amplifier 16 amplifies R, G and B primary color signals supplied from the video signal adjuster 15 into a predetermined amplitude and then supplies the amplified signal to a cathode ray tube (CRT). On the other hand, a high voltage generator 13 uses a high frequency pulse generated in a deflection circuit (not shown) to generate a high voltage of 15–32 kV used as a power source of an anode in the picture tube. Here, beam current detector 14 detects a beam current flowing from the anode to a cathode in the CRT due to the high voltage generated in high voltage generator 13, and supplies an ABL control signal corresponding to the detected beam current to a video signal adjuster 15. The ABL control signal prevents an excessive load in high voltage generator 13 due to an excessive beam current flowing in the CRT. Further, the ABL control signal is used for adjusting characteristics such as the brightness and the contrast of a video signal supplied to the CRT. Beam current detector 14 outputs a low-level ABL control signal when a large beam current flows, while it outputs a high-level ABL control signal when a small beam current flows. Video signal adjuster 15 adjusts the contrast of the picture according to the level of the ABL control signal supplied from beam current detector 14. That is, video signal adjuster 15 heightens the contrast of the picture when a high-level ABL control signal is applied thereto, while it lowers the contrast of the picture when the low-level ABL control signal is applied thereto, thereby preventing damage to the CRT due to excessive beam current or preventing a saturation phenomenon of the picture due to excessive beam current.

However, since the contrast and/or the brightness of the sub-picture is forcedly controlled according to the contrast and/or the brightness of the main picture which occupies most of the picture, the brightness of the sub-picture is influenced by the brightness of the main picture when the difference in brightness between the two pictures is large. Thus, when the main picture is bright, the sub-picture is dark and the beam current is excessive, the video signal adjuster 15 lowers the contrast thereof to make the sub-picture grow darker. On the contrary, when the main picture is dark, the sub-picture is bright and the beam current is insufficient, the video signal adjuster 15 heightens the contrast thereof to cause the creation of a white color saturation phenomenon in the sub-picture.

In U.S. Pat. No. 5,204,748, an FS signal is used for discriminating a main picture and a subordinate picture. When the main picture is displayed, an output signal of a beam current limiter is used for controlling a contrast of a video signal, while when the subordinate picture is displayed, the contrast of the video signal is controlled according to a contrast value output from a receiver controller which is set by a user.

SUMMARY OF THE INVENTION

Therefore, to solve the above problems, it is an object of the present invention to provide a method for preventing a brightness and/or contrast of a sub-picture from being influenced by a brightness and/or contrast of a main picture, in which a separate signal for controlling an automatic beam limit of the sub-picture is created from a sub-video signal in order to use a sub-picture ABL control signal in the case of the sub-video signal, and to use a main picture ABL control signal in the case of the main video signal.

Another object of the present invention is to provide an apparatus embodying the above-mentioned method.

To accomplish the above object of the present invention, there is provided a method for stabilizing a video state of picture-in-picture images having a main picture and a sub-picture which exists within the main picture, the method comprising the steps of:

receiving a main video signal corresponding to the main picture and a sub-video signal corresponding to the sub-picture and multiplexing the main video signal and the sub-video signal so that the sub-picture is displayed within the main picture; generating a selection control signal corresponding to a respective scanning period of the multiplexed main video signal and the multiplexed sub-video signal; receiving beam current derived from a cathode ray tube (CRT) and generating a first automatic beam limiting (ABL) control signal for adjusting beam current which is applied to the CRT; receiving the sub-video signal and generating a second ABL control signal for adjusting beam current which is applied to the CRT according to the sub-video signal; selecting one ABL control signal among the first and second ABL control signals in response to a respective scanning period of the multiplexed main video signal, while using the second ABL control signal to adjust a characteristic of the sub-video signal.

To accomplish the other object of the present invention, there is also provided an apparatus for stabilizing a video state of picture-in-picture images having a main picture and a sub-picture which exists within the main picture, the apparatus comprising:

a cathode ray tube (CRT) for displaying a picture in response to an input video signal; a video signal processor which receives a main video signal corresponding to the main picture and a sub-video signal corresponding to the sub-picture and multiplexes the main video signal and the sub-video signal so that the sub-picture is displayed within the main picture, and generates a selection control signal corresponding to a respective scanning period of the multiplexed main video signal and the multiplexed sub-video signal; main picture ABL control signal circuit for generating a main picture automatic beam limiting (ABL) control signal according to the beam current derived from the CRT; sub-picture ABL control signal circuit for generating a sub-picture ABL control signal using the sub-video signal; a switching portion for receiving the main picture ABL control signal and the sub-picture ABL control signal, selecting and outputting one of the main picture ABL control signal and the sub-picture ABL control signal according to the selection control signal; and a video signal adjuster for receiving the video signals supplied from the video signal processor, adjusting characteristics of the received video signals according to the ABL control signals supplied from the switching portion and supplying the adjusted video signals to the CRT, to adjust characteristics of the main picture and the sub-picture.

DETAILED DESCRIPTION OF THE PREFERRED EMBODIMENT

A preferred embodiment of the present invention will be described below in more detail with reference to the accompanying drawings.

Figure 1:
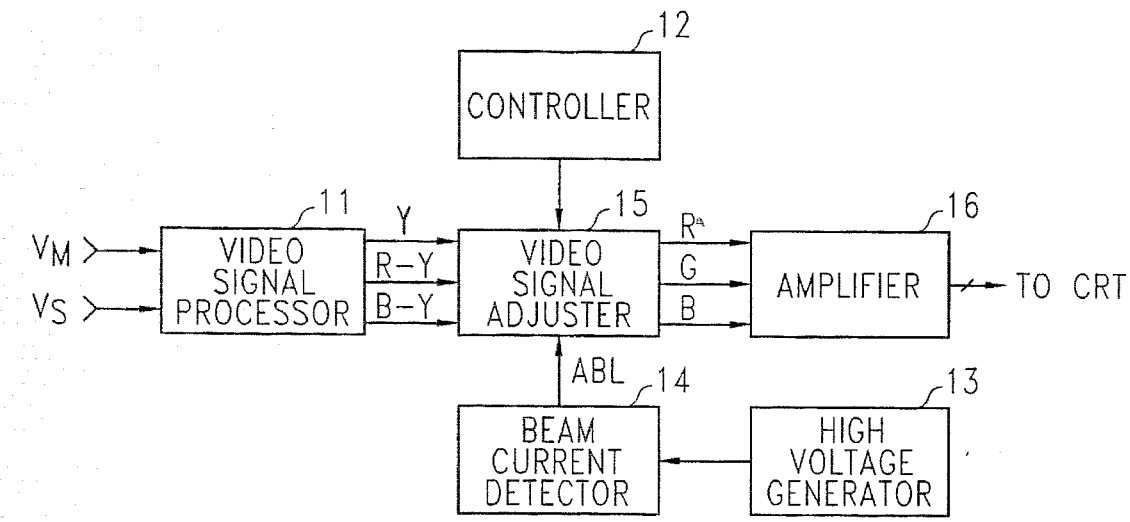
FIG. 1 is a block diagram of a conventional video display having a PIP function.
Figure 2:
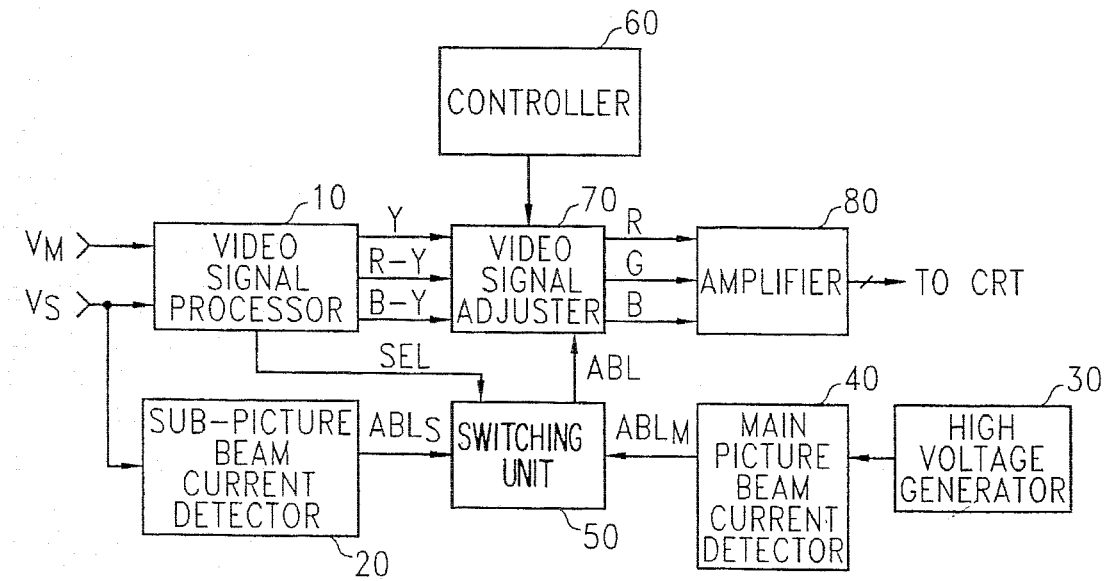
FIG. 2 is a block diagram of a video display having a PIP function according to the present invention.

FIG. 2 is a block diagram showing an apparatus for stabilizing a video state in a display having a PIP function according to the present invention. In FIG. 2, video signal processor 10 receives a main video signal $V_M$ corresponding to a main picture which occupies a major portion of a PIP image and a sub-video signal $V_s$ corresponding to a sub-picture, respectively from external signal sources.

Video signal processor 10 compresses sub-video signal $V_s$ into a signal appropriate to a sub-picture, and then replaces a portion of main video signal $V_M$ with sub-video signal $V_s$ to simultaneously display the main picture and the sub-picture. Then, video signal processor 10 separates the video signal for performing a PIP function which is created by multiplexing main video signal $V_M$ and sub-video signal $V_s$ into a luminance signal Y, red color difference signal R-Y and blue color difference signal B-Y to supply the separated signals to video signal adjuster 70.

Video signal processor 10 also generates a selection control signal SEL corresponding to respective scanning periods for main video signal $V_M$ and sub-video signal $V_s$ in a CRT (not shown), and supplies the generated selection control signal SEL to a switching portion 50.

Figure 3:
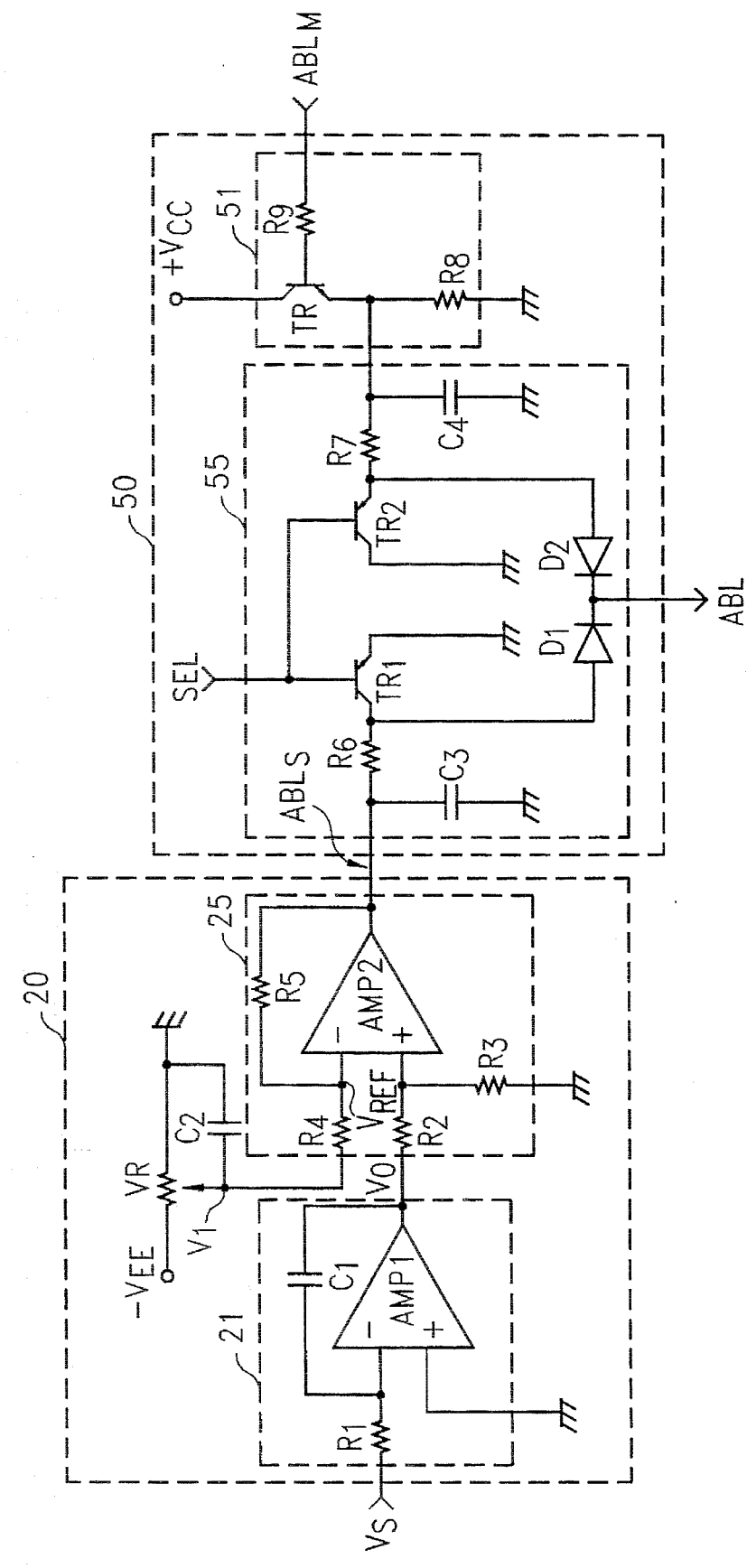
FIG. 3 is a detailed circuit diagram showing a sub-picture beam current detector and a switching portion shown in FIG. 2.

A specific description of sub-picture beam current detector 20 will follow with reference to FIG. 3.

A high voltage generator 30 generates a high voltage used as a power source of an anode in the CRT. Here, main picture beam current detector 40 detects beam current flowing from the anode to a cathode in the CRT due to the high voltage generated in high voltage generator 30, and supplies a main picture ABL control signal ($ABL_M$) to switching portion 50. $ABL_M$ is employed for adjusting a brightness or a contrast of the main picture in correspondence to the detected beam current.

Switching portion 50 selects main picture ABL control signal $ABL_M$ for a scanning period corresponding to the main video signal $V_M$ and selects sub-picture ABL control signal $ABL_s$ for a scanning period corresponding to the sub-video signal $V_s$, in response to selection control signal SEL supplied from video signal processor 10. Then, the selected ABL control signal is supplied to video signal adjuster 70. The specific description of switching portion 50 follows with reference to FIGS. 3 and 4.

Video signal adjuster 70 converts luminance signal Y and color difference signals R-Y and B-Y into primary color signals R, G and B according to a control signal supplied from a controller 60. Controller 60 generates a control signal for controlling the contrast, brightness, color and tone of the picture.

Video signal adjuster 70 also adaptively adjusts the brightness or contrast of the input main video signal $V_M$ and sub-video signal $V_s$ using main picture ABL control signal $ABL_M$ and sub-picture ABL control signal $ABL_s$ which are alternately applied from the switching portion 50.

An amplifier 80 amplifies R, G and B primary color signals supplied from video signal adjuster 70 to a predetermined amplitude and then supplies the amplified signals to a CRT for regenerating the image.

FIG. 3 is a detailed circuit diagram showing a sub-picture beam current detector and a switching portion shown in FIG. 2. Sub-picture beam current detector 20 includes an integrator 21 which integrates input sub-video signal $V_s$ and detects a DC voltage, and a differential amplifier 25 for matching a polarity of the DC voltage to that of main picture ABL control signal $ABL_M$. Integrator 21 includes an amplifier AMP1 in which sub-video signal $V_s$ is applied to the negative input terminal of amplifier AMP1 via resistor R1, the positive input terminal of AMP1 is grounded, and a capacitor C1 is connected between the negative input terminal and the output terminal of AMP1. In differential amplifier 25, a voltage $-V_{EE}$ of a driving power source, which is changed by means of a variable resistor VR and a capacitor C2 is connected between one end of the variable resistor VR and a variable terminal of the variable resistor VR which has a voltage V1, is input to the negative input terminal of amplifier AMP2 via resistor R4, and a resistor R5 is connected between the negative input terminal of AMP2 and the output terminal of AMP2 as a feedback element. The positive input terminal of amplifier AMP2 receives an output $V_o$ from integrator 21 via resistor R2 and is connected to ground through resistor R3.

Switching portion 50 includes a main picture ABL control signal output portion 51 for outputting an input main picture ABL control signal $ABL_M$ and a switch 55 for selectively outputting main picture ABL control signal $ABL_M$ output from main picture ABL control signal output portion 51, and sub-picture ABL control signal $ABL_s$ supplied from sub-picture beam current detector 20, according to a selection control signal SEL. Main picture ABL control signal output portion 51 includes a transistor TR having a collector held at a voltage Vcc and resistors R8 and R9, and functions as a buffer with respect to the input signal $ABL_M$. Switch 55 includes transistors TR1 and TR2 which are relatively turned on or off according to a level of selection control signal SEL which is applied from video signal processor 10, shown in FIG. 2. The output of sub-picture beam current detector 20 is supplied to video signal adjuster 70, shown in FIG. 2, via first transistor TR1 and forward diode D1 of switching portion 50. The output of main picture ABL control signal output portion 51 is supplied to video signal adjuster 70 in FIG. 2 via second transistor TR2 and forward diode D2. First and second transistors TR1 and TR2 determine the respective operating timing according to a time constant value of resistor R6 and capacitor C3, and a time constant value of resistor R7 and capacitor C4.

In integrator 21 of sub-picture beam current detector 20, input sub-video signal $V_s$ is supplied to the negative input terminal of amplifier AMP1 via resistor R1. Here a relationship between input voltage $V_s$ and output voltage $V_o$ of integrator 21 is expressed as follows:

$X_c = 1/jwC = 1/SC$ (wherein S=jw represents a Laplacian denotation.)

$I = V_s/R = -V_o/X_c = -V_o/(1-SC) = -SCV_o$ $V_o/V_s = -1/SCR$

The above equations can be expressed as equation (1) in a time domain.

$$V_o(t) = -(1/RC)\int V_s(t)dt + V_o(O) \quad \ldots (1)$$

That is, output voltage $V_o(t)$ which is obtained from equation (1) becomes a value obtained by integrating input voltage $V_s(t)$, inverting the polarity thereof and multiplying the inverted result by a constant 1/RC. Using equation (1), a voltage corresponding to the beam current of the CRT due to sub-video signal $V_s$ is detected. According to equation (1), when the beam current for the sub-picture is large, an output value is small, while when the beam current is small, the output value becomes large. Since the output value of the DC component maintains a negative polarity potential, the output value is necessary for matching a DC level having a potential of the same polarity as that of the main picture ABL control signal $ABL_M$ detected from the main picture. Thus, differential amplifier 25 receives a voltage $V_o$ applied from integrator 21, at the positive input terminal of amplifier AMP2 via resistor R2, and receives a value $V_{REF}$, which is obtained by adjusting a magnitude of a drive power voltage $-V_{EE}$ via resistor R4, at the negative input terminal, to finally output the sub-picture ABL control signal $ABL_s$. The drive power voltage $-V_{EE}$ has a negative polarity and is varied by variable resistor VR. A detection value of sub-picture ABL control signal $ABL_s$ is expressed by the following equation (2).

Detection value of the sub-picture ABL control signal $ABL_s$ $$= (R3/R2)(V_{out} - V_{REF}) \quad \ldots (2)$$

Here, variable resistor VR adjusts a voltage difference between two input terminals of amplifier AMP2, which can adjust a DC level of the sub-picture ABL control signal $ABL_s$ with respect to a DC level of the main picture ABL control signal $ABL_M$. The sub-picture ABL control signal $ABL_s$ output from differential amplifier 25 is supplied to switching portion 50. On the other hand, main picture ABL control signal $ABL_M$ applied from main picture beam current detector 40 is supplied to main picture ABL control signal output portion 51 of switching portion 50. In the main picture ABL control signal output portion 51, main picture ABL control signal $ABL_M$ is supplied to a base of transistor TR via input resistor R9. Transistor TR outputs a DC voltage corresponding to the main picture ABL control signal $ABL_M$ applied to the base thereof to switch 55 via an output connected to the emitter of TR.

Figures 4A, 4B, 4C, 4D:
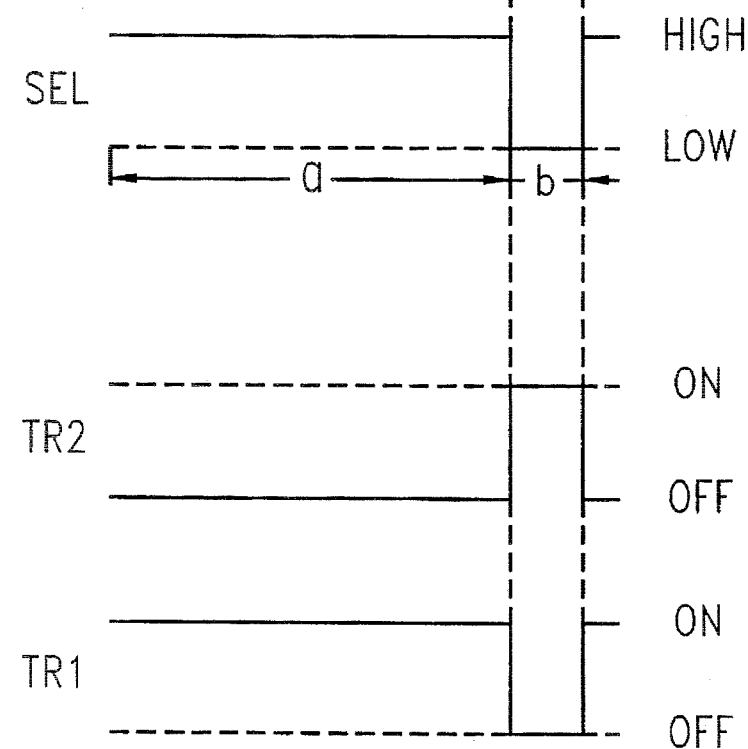
FIG. 4A shows a main picture and a sub-picture which are displayed on the same screen.
FIG. 4B is a waveform diagram showing a selection control signal.
FIG. 4C is a waveform diagram showing an operation state of transistor TR2 in switch 55.
FIG. 4D is a waveform diagram showing an operation state of transistor TR1.

FIGS. 4A through 4D are views for explaining an operation of switching portion 50 in FIG. 3. FIG. 4A shows a main picture and a sub-picture which are displayed on the same screen. FIG. 4B is a waveform diagram showing a selection control signal SEL according to the respective scanning periods of the main picture and the sub-picture, in which selection control signal SEL becomes a high level for an interval where the main video signal is scanned, while SEL becomes a low level for an interval where the sub-video signal is scanned. FIG. 4C is a waveform diagram showing an operation state of transistor TR2 in switch 55. FIG. 4D is a waveform diagram showing an operation state of transistor TR1.

Returning to FIG. 3, selection control signal SEL of FIG. 4B corresponding to the PIP image shown in FIG. 4A is applied to the base of transistors TR1 and TR2 in switch 55. Since selection control signal SEL has a high state during a scanning period (a) of main video signal $V_M$, first transistor TR1 becomes an ON state as shown in FIG. 4D, and second transistor TR2 becomes an OFF state as shown in FIG. 4C. Thus, first transistor TR1 discharges the DC voltage of sub-picture ABL control signal $ABL_s$ applied to the collector of TR1 via ground. Accordingly, a diode D1 connected to the collector is not turned on. On the other hand, second transistor TR2 which is in the OFF state supplies the DC voltage of main picture ABL control signal $ABL_M$, which is supplied to the emitter of TR2, to video signal adjuster 70 via diode D2. On the other hand, a low level signal as shown in FIG. 4B is supplied to the base of the two transistors TR1 and TR2 during an interval (b) when the sub-picture is scanned. First transistor TR1 enters an OFF state, as shown in FIG. 4D, to supply the DC voltage applied to the collector of TR1 to video signal adjuster 70 via diode D1 as shown in FIG. 4. On the other hand, second transistor TR2 enters an ON state, as shown in FIG. 4C, to supply the DC voltage applied to the emitter of TR2 to ground via the collector of TR2. Accordingly, diode D2 which is connected to the output terminal is not turned on. Thus, when the main picture signal is displayed on the screen, a brightness and/or contrast are adjusted by main picture ABL control signal $ABL_M$. When the sub-picture signal is displayed, the brightness and/or contrast are adjusted by sub-picture ABL control signal $ABL_s$.

As described above, the present invention detects beam current of the video signal to be displayed in sub-picture region of the PIP screen. Also, the main picture ABL control signal and the sub-picture ABL control signal are used to adjust a brightness characteristic and/or a contrast characteristic of the corresponding video signal. Accordingly, the sub-picture is not influenced by the main picture.

What is claimed is:

1. An apparatus for stabilizing a video state of picture-in-picture images having a main picture and a sub-picture which exists within the main picture, said apparatus comprising:

a cathode ray tube (CRT) for displaying a picture in response to an input video signal;

a video signal processor which receives a main video signal corresponding to the main picture and a sub-video signal corresponding to the sub-picture, for multiplexing the main video signal and the sub-video signal so that the sub-picture is displayed within the main picture, and generating a selection control signal based on the multiplexed main video signal and the multiplexed sub-video signal;

means for generating a main picture automatic beam limiting (ABL) control signal based on a main-picture beam current derived from said CRT, wherein said main-picture beam current corresponds to said main video signal;

means for generating a sub-picture automatic beam limiting (ABL) control signal based on a sub-picture beam current which would be produced in said CRT by said sub-video signal;

a switching unit for receiving said main picture ABL control signal and said sub-picture ABL control signal, selecting and outputting one of the received control signals according to said selection control signal; and a video signal adjuster for receiving the video signals supplied from the video signal processor, adjusting characteristics of the received video signals according to the ABL control signal output from said switching unit and supplying the adjusted video signals to said CRT, to adjust characteristics of the main picture and the sub-picture.

2. An apparatus for stabilizing a video state according to claim 1, wherein said sub-picture ABL control signal generating means outputs a low value of the sub-picture ABL control signal when a value of current of the sub-video signal is large, while said sub-picture ABL control signal generating means outputs a high level sub-picture ABL control signal when the value of current of the sub-video signal is small.

3. An apparatus for stabilizing a video state according to claim 2, wherein said sub-picture ABL control signal generating means comprises:

an integrator for integrating the sub-video signal and outputting a voltage value of a DC component; and a differential amplifier which receives the voltage value of the DC component output from said integrator and outputs the sub-picture ABL control signal having a polarity matching a polarity of the main picture ABL control signal.

4. An apparatus for stabilizing a video state according to claim 3, wherein said differential amplifier receives a power voltage having a negative polarity via an inverting input terminal thereof and receives the output of said integrator via a non-inverting input terminal thereof.

5. An apparatus for stabilizing a video state according to claim 4, further comprising a variable resistor for varying the magnitude of said power voltage applied to said differential amplifier.

6. An apparatus for stabilizing a video state according to claim 1, wherein said switching unit comprises:

a first transistor which receives said selection control signal via the base thereof, and outputs said sub-picture ABL control signal applied via the collector thereof according to a state of the level of said selection control signal;

a second transistor which receives said selection control signal via the base thereof, and outputs said main-picture ABL control signal applied via the collector thereof according to a state of the level of said selection control signal; and an output terminal which outputs one of the outputs of said first and second transistors to said video signal adjuster, wherein said switching unit outputs said main picture ABL control signal applied from said second transistor when said selection control signal is in a first state, and outputs said sub-picture ABL control signal applied from said first transistor when said selection control signal is in a second state.

7. An apparatus for stabilizing a video state according to claim 6, further comprising a first combination of a resistor and a capacitor which are connected to the collector of said first transistor, and a second combination of a resistor and a capacitor which are connected to the collector of said second transistor.

8. A method for stabilizing a video state having a main picture and a sub-picture which exists within the main picture, said method comprising the steps of:

(a) receiving a main video signal corresponding to the main picture and a sub-video signal corresponding to the sub-picture and multiplexing said main video signal and said sub-video signal so that the sub-picture is displayed within the main picture;

(b) generating a selection control signal based on the multiplexed main video signal and the multiplexed sub-video signal;

(c) receiving a beam current signal based on a beam current derived from a cathode ray tube (CRT) and generating a first automatic beam limiting (ABL) control signal for adjusting said beam current of said CRT according to said main video signal;

(d) receiving said sub-video signal and generating a second ABL control signal for adjusting said beam current of said CRT according to a beam current which would be produced in said CRT based on said sub-video signal;

(e) selecting one ABL control signal among said first and second ABL control signals in response to said selection control signal; and (f) using said first ABL control signal to adjust a characteristic of said main video signal, while using said second ABL control signal to adjust a characteristic of said sub-video signal.

9. A method for stabilizing a video state according to claim 8, wherein said step (d) comprises the steps of:

(g) generating a voltage value of a DC component by integrating the sub-video signal; and (h) adjusting the voltage value of the DC component to match a voltage value of said first ABL control signal.

10. An apparatus for stabilizing a video state according to claim 1, wherein said selection control signal is generated based upon a scanning period of the multiplexed main video signal and a scanning period of the multiplexed sub-video signal.

11. A method for stabilizing a video state according to claim 8, wherein said selection control signal is generated based upon a scanning period of the multiplexed main video signal and a scanning period of the multiplexed sub-video signal.

12. An apparatus for stabilizing a video state of picture-in-picture images having a main picture and a sub-picture which exists within the main picture, said apparatus comprising:

a cathode ray tube (CRT) for displaying a picture in response to an input video signal;

a video signal processor which receives a main video signal corresponding to the main picture and a sub-video signal corresponding to the sub-picture, for multiplexing said main video signal and the sub-video signal so that said sub-picture is displayed within the main picture, and generating a selection control signal based on the multiplexed main video signal and the multiplexed sub-video signal;

a first generator for generating a main picture automatic beam limiting (ABL) control signal according to a beam current signal derived from a beam current of said CRT;

a second generator for generating a sub-picture automatic beam limiting (ABL) control signal according to a beam current which would be produced in said CRT based on said sub-video signal;

a switching circuit for receiving said main picture ABL control signal and said sub-picture ABL control signal, selecting and outputting one of the received ABL control signals according to said selection control signal; and a video signal adjuster for receiving the video signals supplied from said video signal processor, adjusting characteristics of the received video signals according to the ABL control signal output from said switching circuit and supplying an adjusted video signal to said CRT, to adjust characteristics of the main picture and the sub-picture independently from one another.

13. An apparatus for stabilizing a video state according to claim 6, wherein said first state is a high level and said second state is a low level.

* * * * *